(12) United States Patent
Gordon et al.

(10) Patent No.: US 11,649,024 B2
(45) Date of Patent: May 16, 2023

(54) ESCAPE SYSTEM

(71) Applicant: SURVITEC GROUP LIMITED, Birkenhead (GB)

(72) Inventors: Peter Gordon, Liverpool (GB); Stewart Gregory, Birkenhead (GB)

(73) Assignee: SURVITEC GROUP LIMITED, Birkenhead (GB)

(*) Notice: Subject to any disclaimer, the term of this patent is extended or adjusted under 35 U.S.C. 154(b) by 488 days.

(21) Appl. No.: 16/626,112

(22) PCT Filed: Jul. 3, 2018

(86) PCT No.: PCT/EP2018/067957
§ 371 (c)(1),
(2) Date: Dec. 23, 2019

(87) PCT Pub. No.: WO2019/007962
PCT Pub. Date: Jan. 10, 2019

(65) Prior Publication Data
US 2020/0216154 A1 Jul. 9, 2020

(30) Foreign Application Priority Data
Jul. 3, 2017 (GB) .................................... 1710622

(51) Int. Cl.
*B63C 9/22* (2006.01)
*B63B 27/14* (2006.01)
(Continued)

(52) U.S. Cl.
CPC .............. *B63C 9/22* (2013.01); *B63B 27/143* (2013.01); *A62B 1/20* (2013.01);
(Continued)

(58) Field of Classification Search
CPC .................. B63B 27/14; B63B 27/143; B63B 2027/145; B63B 27/28; B63B 21/04;
(Continued)

(56) References Cited

U.S. PATENT DOCUMENTS

| | | | | |
|---|---|---|---|---|
| 3,433,323 A | * | 3/1969 | Prefecture | B63B 27/28 52/2.21 |
| 3,819,011 A | * | 6/1974 | Kinase | B63B 27/28 193/25 B |
| 3,994,366 A | * | 11/1976 | Okuma | B63C 9/22 182/48 |
| 4,498,557 A | * | 2/1985 | Horne | A62B 1/20 193/12 |

(Continued)

FOREIGN PATENT DOCUMENTS

| | | |
|---|---|---|
| GB | 1389591 | 4/1975 |
| GB | 1465062 | 2/1977 |

(Continued)

OTHER PUBLICATIONS

International Search Report and Written Opinion dated Nov. 6, 2018, in related PCT Application No. PCT/EP2018/067957, 11 pgs.
Search Report dated Mar. 22, 2018, in priority application No. GB 1710622.0, 4 pgs.

*Primary Examiner* — Daniel V Venne
(74) *Attorney, Agent, or Firm* — Maschoff Brennan

(57) ABSTRACT

An escape system comprises a slide for facilitating evacuation of from a structure to water, wherein the slide comprises at least one helical inflatable path. The or each helical inflatable path may be configured to extend generally vertically between the structure and the water. The slide may comprise a plurality of helical inflatable paths. The slide may comprise spacing means for controlling the pitch between helix turns of the or each of the helical inflatable paths. A bowsing arrangement for the slide is also disclosed.

30 Claims, 14 Drawing Sheets

(51) Int. Cl.
  *A62B 1/20*     (2006.01)
  *B63C 9/04*     (2006.01)
  *B64D 25/14*    (2006.01)

(52) U.S. Cl.
  CPC ........... *B63B 2027/145* (2013.01); *B63C 9/04* (2013.01); *B63C 2009/042* (2013.01); *B64D 25/14* (2013.01)

(58) Field of Classification Search
  CPC ............... B63B 2021/003; B63C 9/04; B63C 2009/04; B63C 2009/042; B63C 9/22; B64D 25/14; A62B 1/20
  USPC .......................................... 114/365, 366, 375
  See application file for complete search history.

(56)         References Cited

U.S. PATENT DOCUMENTS

| | | | |
|---|---|---|---|
| 5,765,500 | A | 6/1998 | Nordbø |
| 8,312,967 | B2 * | 11/2012 | Nielsen .................... A62B 1/20 |
| | | | 182/48 |
| 9,272,757 | B2 * | 3/2016 | Ibsen ........................ B63C 9/22 |
| 9,278,731 | B1 * | 3/2016 | Canela ...................... B63B 7/08 |
| 9,340,262 | B1 * | 5/2016 | Boyd ...................... B63B 27/143 |
| 10,875,607 | B2 * | 12/2020 | Hardee ................... B63B 7/082 |

FOREIGN PATENT DOCUMENTS

| | | |
|---|---|---|
| GB | 2252283 | 8/1992 |
| GB | 2308345 | 6/1997 |
| WO | 2015/075058 | 5/2015 |

\* cited by examiner

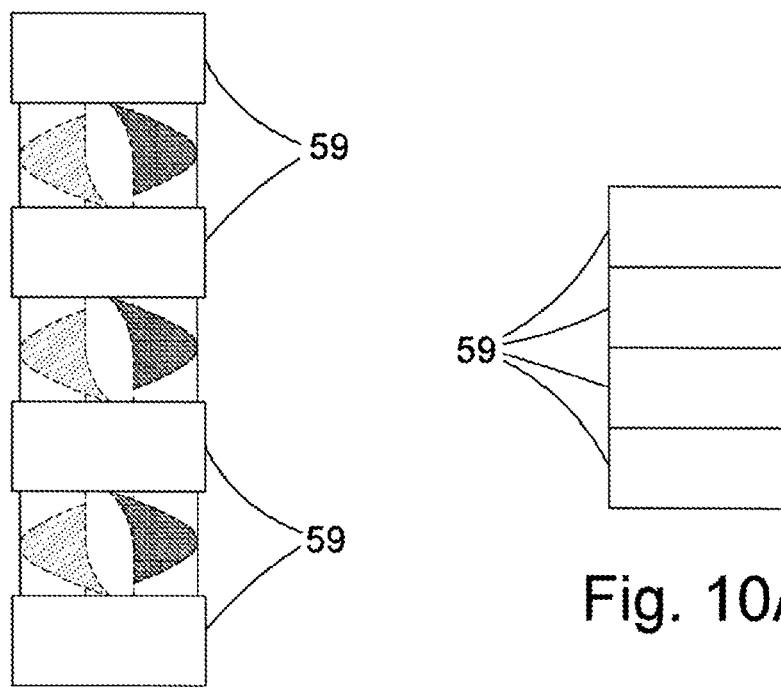
Fig. 9A
Fig. 10A
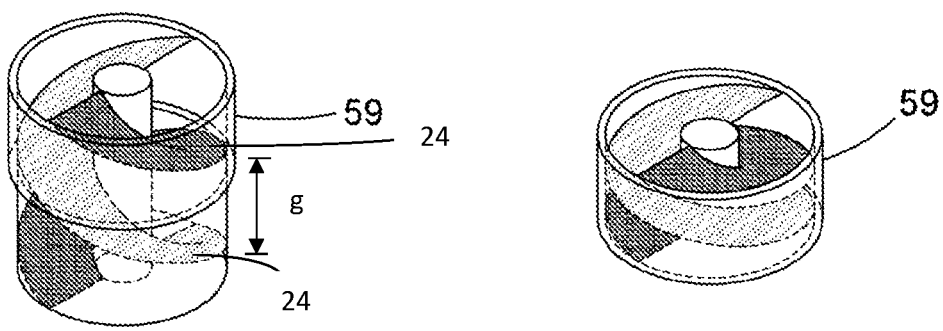
Fig. 9B
Fig. 10B

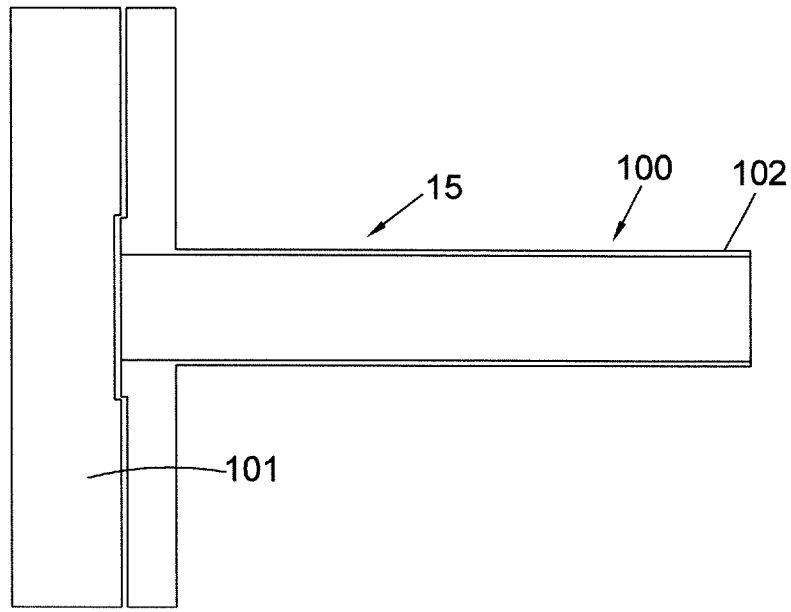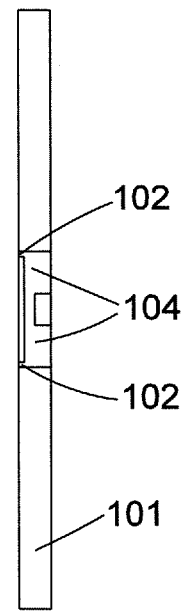
Fig. 19A  Fig. 19B
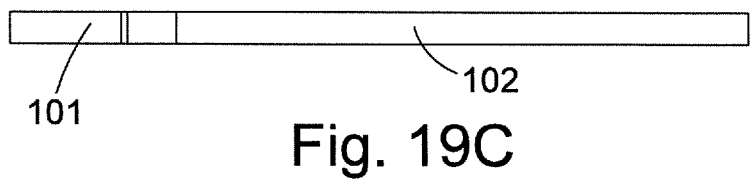
Fig. 19C

ESCAPE SYSTEM

TECHNICAL FIELD

The present invention relates to an escape system comprising a slide for facilitating evacuation from a structure to water. The present invention also relates to a bowsing arrangement for an escape system.

BACKGROUND TO THE INVENTION

An escape system, such as an evacuation system is used for evacuating people from a structure at sea in the event of an emergency. Such a structure may be an oil rig or a ship.

One form of evacuation system includes an inflatable craft into which the people are evacuated. Since, when inflatable crafts are deployed on water, there is usually a significant difference in height (freeboard) between the point on the structure from which the people are evacuated and the inflatable crafts on the water, it is necessary to provide some form of passage between the two.

It is known to provide an angled or vertical passage, which may be formed from inflatable members, extending between the evacuation point and the inflatable crafts. The angled or vertical passage can extend either direct to the inflatable crafts or to an inflatable floating structure or platform to which the inflatable crafts are attached. In some vessels, the freeboard may be 14-15 metres and so the angled or vertical passage is of significant length.

Evacuation systems should preferably be able to operate in force six weather which will include a 3 metre swell.

An angled or vertical passage is not readily able to meet such a requirement as the angled or vertical passage projects from the side of a vessel and is subjected to significant lateral movements in heavy weather which may make evacuation hazardous.

GB2308345 (Wardle Storeys) discloses a marine escape system having a chute in the form of a flexible helical tube which extends between an evacuation point on a vessel and an inflatable liferaft. The helical tube has stiffening bands and is further supported by a plurality of rigid hoops which are connected to surround the chute by cords and resilient elastomeric members. The connection between the evacuation point and one of the hoops is by non-elastic flexible members, with further connection from the hoop to the liferaft by means of flexible elastic members held in tension so that, as the liferaft moves on the swell, the tube extends and retracts.

WO2015075058 (Survitec Group Ltd, our ref: 06641) discloses a marine escape system for evacuating a marine structure comprising a chute, a buoyant non-inflatable platform and at least one inflatable life raft. These parts are deployable from a packed disposition on the structure to a disposition in which the chute leads from the structure to the platform floating on the water and the platform leads to the inflated life raft so providing a passage for people from the structure to the life raft. In an alternative embodiment, the platform may be either inflatable or non-inflatable and be formed by inner and outer parts that are relatively rotatable to allow, on deployment, the life raft to swing relative to the chute.

GB1465062 (DUNLOP LTD) discloses an inflatable escape chute consists of inflatable tubes, and a connecting piece and inflatable liferafts connected to it by painters, through the intermediary of an inflatable platform. The apparatus is stowed on the deck of a ship, preferably under a hinged ramp which pivots overboard when the chute is inflated, and may act to support the upper part of the chute. The platform may be attached to the chute, or its inflatable surround may be integral with the chute tubes. The chute may be divided into two parallel chutes by a central longitudinal tube. The floor of the platform is preferably formed of inflatable tubes. The platform may be stabilized by means of drogues or water pockets.

U.S. Pat. No. 5,765,500 discloses a system that has a group of inflatable life rafts, including a reception raft and evacuation rafts, and a chute in the form of a stocking for transferring people from a ship to the life rafts. The life rafts are held deflated on a frame that can be lowered from a ship into the water where the life rafts inflate on the water and the frame continues beneath the water to stabilise the reception raft and the stocking via wires that pass from the frame to the ship through the reception raft and the stocking. The stocking leads to the reception raft so providing a pathway for people from the ship to the reception raft and thence to the life rafts.

It would be desirable to provide an improved evacuation system able to be operated safely in heavy weather.

SUMMARY OF THE INVENTION

A first aspect of the present invention provides an escape system comprising a slide for facilitating evacuation of a structure to water, wherein the slide comprises at least one helical inflatable path.

The structure may a ship or other vessel, or an oil rig, for example.

The or each helical inflatable path may be configured to extend generally vertically between the structure and the water. This may make the slide safer to use in adverse weather conditions.

The slide may comprise a plurality of helical inflatable paths. This may increase the evacuation rate from the structure.

A first of said helical inflatable paths and a second of said helical inflatable paths may have a common central axis. A first of said helical inflatable paths and a second of said helical inflatable paths may have a double helix configuration. The first of said helical inflatable paths and the second of said helical inflatable paths may be interlaced or intertwined.

Two or more of said helical inflatable paths may be arranged side by side with spaced apart and substantially parallel central axes.

The slide may comprise spacing means for controlling the pitch between helix turns of the or each of the helical inflatable paths.

The spacing means may be operable to set a minimum distance between two adjacent helix turns of the or each of the helical inflatable paths. This may prevent a slide path being blocked when the freeboard is reduced.

The spacing means may comprise a plurality of tubular parts attached to the slide, the gap between adjacent ones of the tubular parts varying with the pitch between the helix turns, and the abutment of adjacent tubular parts (when the gap closes) preventing the distance between two adjacent helix turns falling below said minimum distance.

The spacing means may be operable to maintain a substantially equal distance between adjacent helix turns of the or each of the helical inflatable paths. This may reduce the likelihood of a part of a slide path being blocked when the freeboard is reduced.

The spacing means may comprise a plurality of elastically deformable cables extending along the slide, the cables being attached to the slide at spaced apart locations along the length of the slide and being held in tension.

The spacing means comprises a winch or pulley system.

The slide may include a plurality of bowsing attachment parts spaced apart along the slide between an entrance to the slide at the structure and the water.

The slide may include at least one exit configured to allow evacuees from the structure to transfer directly from the slide to at least one craft (e.g. inflatable liferaft).

The escape system may include a platform for floating on the water, the platform being attached to the slide. The platform may be configured to secure thereto the or each craft during boarding of the evacuees. The platform may be inflatable.

The the or each helical path may be formed by a plurality of partially overlapping sections. Each of said sections may have an upper surface having an exposed portion and an overlapped portion that is overlapped by the one of the sections above, the exposed portions of the upper surfaces of the sections being arranged to define the helical path.

The slide may include a linear path portion that extends from the helical inflatable path. The linear path portion may extend obliquely to a central axis of the helical inflatable path. An exit of the slide may be formed at an end of the linear portion.

The slide and/or platform may comprise inflatable drop stitch material. This may provide high strength and maintain the desired shape when inflated to high pressures.

The dimensions of the slide may be so chosen that evacuees from the structure travel along the helical path at a speed of between 1 and 10 kph. One of the dimensions may be a diameter of a substantially cylindrical space around which the or each helical path extends. One of the dimensions may be a pitch of the or each helical path. One of the dimensions may be a length of the slide.

The slide may include a substantially cylindrical outer wall extending around an outer periphery of the or at least one of the helical paths, the outer wall being longitudinally elastically deformable to accommodate changes in distance between an entrance to the or each slide at the structure and the water.

The slide includes a substantially cylindrical inner wall extending around an inner periphery of the or at least one of the helical paths, the inner wall being longitudinally elastically deformable to accommodate changes in distance between an entrance to the or each slide at the structure and the water.

A second aspect of the present invention provides an escape system comprising a slide for facilitating evacuation of from a structure to water, wherein the slide comprises at least one helical path, wherein the or each helical path is formed by a plurality of partially overlapping sections. Some or all of the sections may be inflatable. Some or all of the sections may be non-inflatable. Each of said sections may have an upper surface having an exposed portion and an overlapped portion that is overlapped by the one of the sections above, the exposed portions of the upper surfaces of the sections being arranged to define the helical path.

A third aspect of the present invention provides a marine escape system comprising the escape system as mentioned above, further including at least one craft coupleable to said slide for receiving evacuees from the structure. The or each craft may be inflatable. The or each craft may be a liferaft.

A fourth aspect of the present invention provides a bowsing arrangement for an escape system that has a slide for facilitating evacuation of from a structure to water, the bowsing arrangement including a plurality of retractable or removable bowsing attachment parts for being mounted spaced apart to the structure and for attachment to corresponding attachment parts spaced along the slide between an entrance to the slide at the structure and the water.

The bowsing attachment parts may be configured to be magnetically coupled to the structure. The bowsing attachment parts may include an inflatable portion. The bowsing attachment parts comprise a plurality of sections moveable between a deployed configuration and a retracted configuration, e.g., the bowsing attachment part sections being configured foldable or mounted for telescopic relative movement. The bowsing attachment parts may be configured to be coupled to the structure by suction.

BRIEF DESCRIPTION OF THE DRAWINGS

For a better understanding of the present invention embodiments will now be described by way of example, with reference to the accompanying drawings, in which:

FIG. 9A shows a simplified side elevational view of the fifth spacing arrangement for the helix turns of a slide assembly in an expanded state;

FIG. 9B shows a partial view of the fifth spacing arrangement for the helix turns of a slide assembly in an expanded state;

FIG. 10A shows a simplified side elevational view of the fifth spacing arrangement for the helix turns of a slide assembly in a contracted state;

FIG. 10B shows a partial view of the fifth spacing arrangement for the helix turns of a slide assembly in a contracted state;

FIG. 19A shows an overhead plan view of a platform for attachment to the slides and crafts;

FIG. 19B shows a front elevational view of the platform of FIG. 19A; and

FIG. 19C shows a side elevational view of the platform of FIG. 19A.

In the drawings, like elements are generally designated with the same reference sign.

DETAILED DESCRIPTION OF EMBODIMENTS OF THE INVENTION

Figure 1:
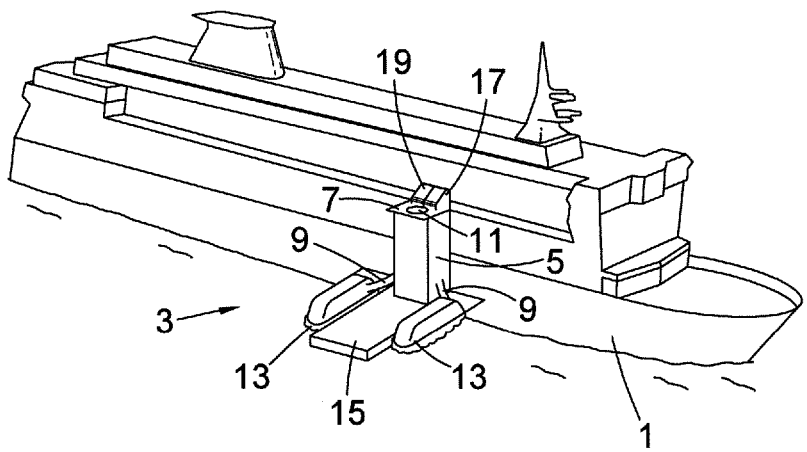
FIG. 1 shows a perspective view of a vessel with an escape system including a slide for evacuating passengers to crafts.

FIG. 1 shows a ship or other vessel 1 that has an escape system 3 provided on board and which is shown in a deployed state.

The escape system 3 includes a slide 5 that provides one or more passages from an entry platform 7 on the ship 1 to one or more exits 9. The entry platform 7 includes one or more entrances 11 to the slide 5. The slide 5 may be inflatable.

When it is desired to evacuate the ship 1, passengers enter the slide 5 via the entrance or entrances 11 and travel down the slide 5 until they reach the exit or exits 9 at or near the sea level, and from where they can board one or more life rafts (or other type of crafts) 13.

Crafts 13 may be inflatable. The crafts 13 may be of the type disclosed in our patent application number PCT/EP2017/053693 (publication number WO2017/140890) filed on 17 Feb. 2017 (our ref: 07076).

The escape system may comprise a floating sea platform 15 that is generally T-shaped and defines two recesses for accommodating the life rafts 13 during boarding of the evacuated passengers. The sea platform 15 may be inflatable.

The slide 5, life rafts 3 and sea platform 15 may be stored in a deflated state in storage unit 17 fixed to the ship 1. The escape system 3 advantageously occupies a small area on the ship 1, so freeing up space for passenger accommodation and windows. The storage unit 17 is closed by doors 19 in order to control the environment in which the deflated escape system is stored.

When it is desired to deploy the escape system 3, it is inflated by a supply of compressed gas on the ship 1. The doors 19 are opened and the slide 5, life rafts 13 and sea platform 15 are lowered to the surface of the sea.

The slide 5 extends generally vertically. The slide extends generally parallel to the side of the ship 1.

Figure 2:
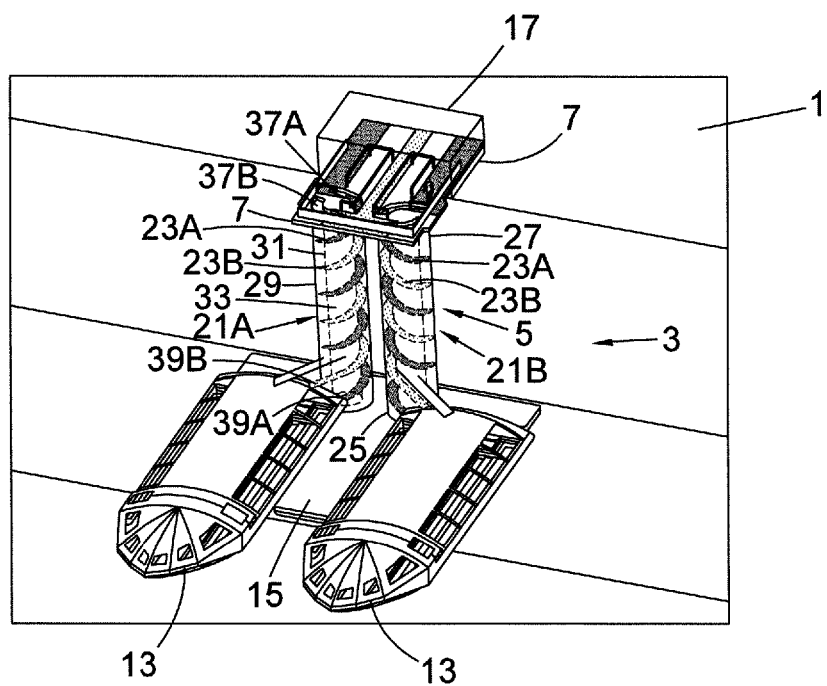
FIG. 2 shows a close up perspective view of a slide having two side-by-side slide assemblies providing helical escape paths for passengers.

FIG. 2 shows one embodiment of the slide 5 in more detail. In this embodiment the slide 5 comprises two slide assemblies 21a and 21b. Each of the slide assemblies 21a and 21b provides two helical paths 23a and 23b, each having a plurality of helix turns (a helix turn being a 360° turn of the path). One of the slide assemblies 21a will now be described in detail. The other of the slide assemblies 21b is of the same configuration.

The slide assembly 21a is of generally cylindrical or tubular form, and has an exit end 25 attached to the sea platform 15 and an entry end 27 attached to the entry platform 7. The slide assembly 21a includes a substantially cylindrical outer wall 29 and substantially cylindrical inner wall 31. The outer wall 29 and inner wall 31 are formed from elastically deformable sheet material. The inner wall 31 defines a central substantially cylindrical space 33 along which the central axes of the helical paths 23a and 23b extend.

Between the outer wall 29 and the inner wall 31 an annular space is defined that accommodates the helical paths 23a and 23b. The helical paths 23a and 23b are connected (or fixed) to the outer wall 29 and inner wall 31. This enables the pitch of the helix turns to vary without imparting a twisting movement on the slide.

The helical paths 23a and 23b may have a double helix configuration. The helical paths 23a and 23b are interlaced. Each of the helical paths 23a and 23b turn in the same sense (clockwise/anticlockwise) about the cylindrical space 33.

The entrance 37a to the helical path 23a is spaced on the entry platform 7 from the entrance 37b to the helical path 23b, thereby allowing passengers to enter each of the helical paths 23a and 23b simultaneously.

The helical path 23a has an exit 39a directly into a first of the lifeboats 13, and the other helical path 23b has an exit 39b directly into the same life raft 13.

Although two helical paths 23a and 23b are described, it should be appreciated that one, three or more helical paths may be provided.

The pitch or distance between adjacent helix turns of the helical paths 23a and 23b will vary as the distance between the entry platform 7 and the surface of the water (freeboard) changes, and also due to the effect of evacuee passengers travelling along the helical paths 23a and 23b and distorting the slide due to their weight. This movement can be referred to as concertinaing of the slide assembly 21. The main deck height (where the entry platform 7 is mounted) from waterline may be, e.g., 16 metres. The sea conditions may be such that this distance may vary vertically +/−6 metres.

Various different arrangements for controlling the spacing between the helix turns will now be described.

Figures 3, 4:
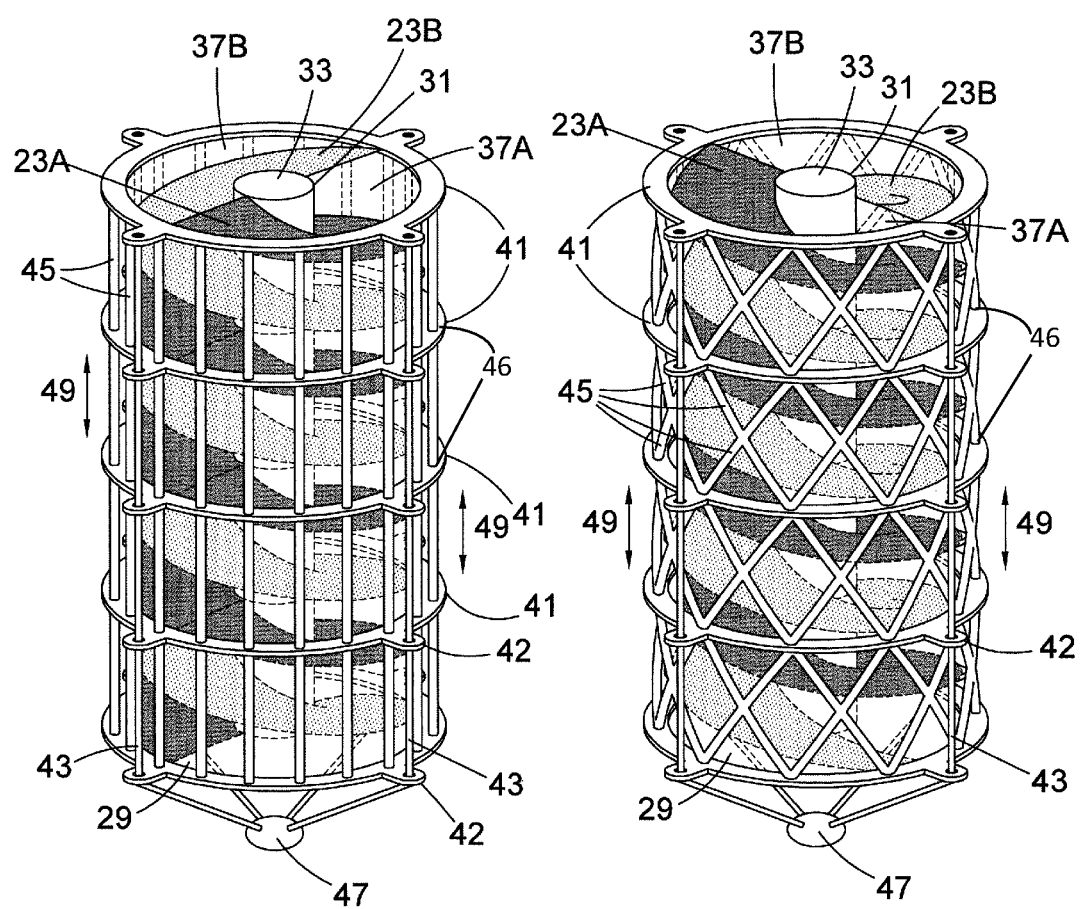
FIG. 3 shows a perspective view of a first spacing arrangement for the helix turns of a slide assembly.
FIG. 4 shows a perspective view of a second spacing arrangement for the helix turns of a slide assembly.

FIGS. 3 and 4 show alternative arrangements in which a series of spaced apart annular plates 41 are provided that are fixed to the outer wall 29. The annular plates 41 each include a plurality of circumferentially distributed apertures or eyes (four are shown in the examples) through which a corresponding plurality of wires or lines 43 are slidably mounted, in order to maintain the cylindrical shape of the slide while allowing the length to vary. The wires/lines 43 are fixed at the top of the slide 5 and run through eyes in each annular plate 41 and have a weight 47 below the water surface to keep them taut.

Opposite facing surfaces of the adjacent annular plates 41 have fixed thereto opposite ends of a plurality of elastically deformable members 45. In the embodiments these elastically deformable member are elastic cords or ropes. The uppermost annular plate 41 is fixed to the entry platform 7. The weight 47 may comprise a heavy ballast weight to prevent the elasticity of the members 45 lifting the sea platform 15 from the water.

The elastically deformable members 45 may be configured in a linear or diagonal truss bungee arrangement, as shown in FIGS. 3 and 4, respectively. In FIG. 3 the elastically deformable members 45 extend parallel to one another and to the central axis of the helical paths 23*a* and 23*b*. In FIG. 4 the elastically deformable members 45 extend obliquely to the central axis of the helical paths 23*a* and 23*b* in two different directions, the elastically deformable members 45 crossing one another between the annular plates 41.

The elastically deformable members 45 are held in tension in normal sea conditions by weight 47. The elastically deformable members 45 are attached to the slide at spaced apart locations 46 along a length of the slide.

Because the elastically deformable members 45 have substantially identical elasticity, this tends to maintain a constant pitch along the helical paths 23*a* and 23*b*, so that the space 49 between adjacent helix turns remains equal as the slide is longitudinally extended and contacted due to movement of the ship 1 in the water.

Figures 5A, 5B, 5C:
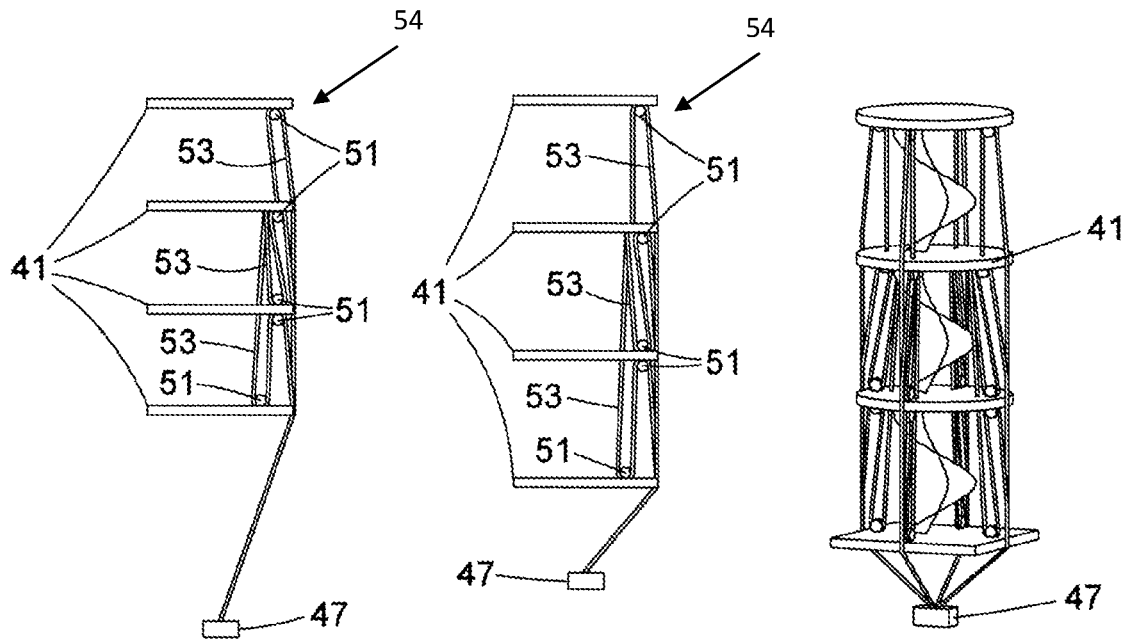
FIGS. 5A and 5B show a simplified side elevational view of a third spacing arrangement for the helix turns of a slide assembly.
FIG. 5C shows a simplified perspective view of the third spacing arrangement for the helix turns of a slide assembly.

An alternative approach to controlling the pitch of the helical paths 23*a* and 23*b* is shown in FIGS. 5A, B and C. In this arrangement spaced annular plates 41, like those described with reference to FIGS. 3 and 4 are again provided. For the sake of clarity FIGS. 5A, B and C do not show the helical paths, other than schematically in FIG. 5C.

A series of pulleys 51 and lines 53 (comprising a pulley system 54) are provided that are attached to the annular plates 41 to maintain the annular plates 41 equidistant. The lines 53 are all attached to the weight 47. Each of the lines 53 is of the same length and is attached to one of the plates 41. Each line passes around one or more pulleys 51 before being attached to a plate 41 in order to control the longitudinal position of that plate 41. As in FIG. 3 and FIG. 4, a weight 47 is provided in order to keep the lines 53 in tension.

Figures 6A, 6B, 6C:
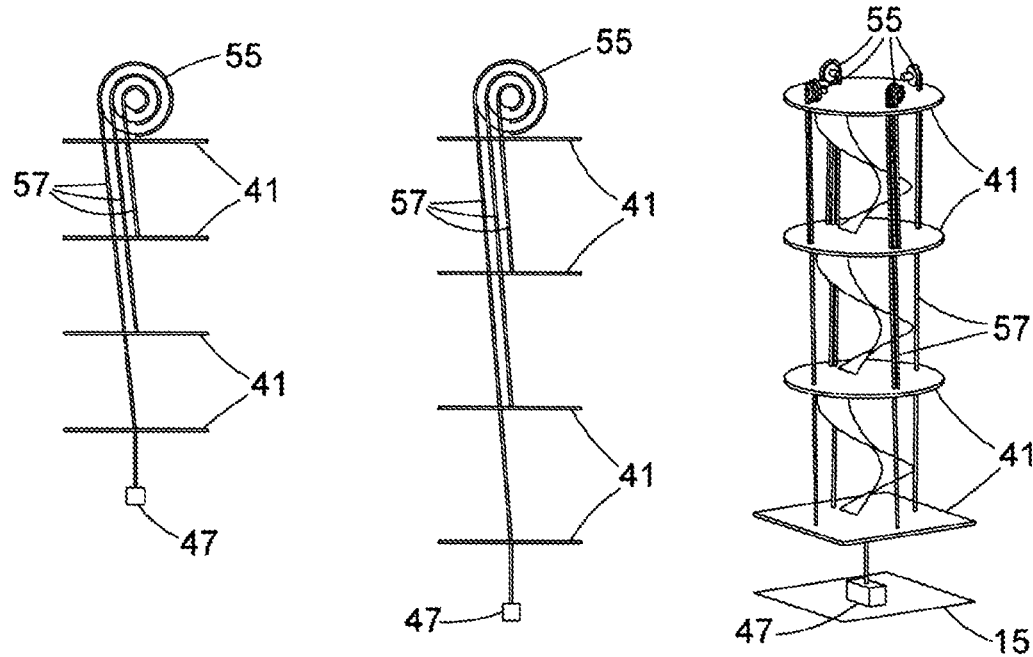
FIGS. 6A and 6B show a simplified side elevational view of a fourth spacing arrangement for the helix turns of a slide assembly.
FIG. 6C shows a simplified perspective view of the fourth spacing arrangement for the helix turns of a slide assembly.

FIGS. 6A, B and C show a further alternative arrangement for maintaining an equal pitch between the helix turns of the helical paths 23*a* and 23*b*. In this arrangement spaced annular plates 41, like those described with reference to FIGS. 3 and 4 are again provided. For the sake of clarity FIGS. 6A, B and C do not show the helical paths, other than schematically in FIG. 6C.

In this embodiment one or more constant tension winches 55 are provided with multiple drum diameter sections, around each of which a respective line 57 is wound, the distal end of each of the lines 57 being attached to a respective one of the annular plates 41. The platform mount 47 is weighted in this embodiment in order to keep the lines 53 in tension. This arrangement requires a source of power for the winch 55 and a feedback system. The arrangement of FIGS. 6A, B and C may be combined with the arrangement of FIGS. 5A, B and C.

FIGS. 7, 9A, 9B, 10A and 10B show an arrangement for maintaining a minimum pitch or spacing between adjacent helix turns of the helical paths 23*a* and 23*b*. In this embodiment, as in FIGS. 3, 4, 5 and 6 wires/lines 43 are provided. However, in this arrangement, rather than annular plates 41, a series of hollow cylinders or tubular parts 59 are provided to which the wires/lines 43 are slidably coupled. The cylinders 59 may be coupled to each other by elastically deformable members 45 (not shown) as in FIG. 3 or 4.

A gap "g" between adjacent ones of the plurality of cylinders or tubular parts 59 varies with the pitch between the two adjacent helix turns 24. According to this embodiment, when the distance (freeboard) between the entry platform 7 and the surface of the sea reduces significantly, and the elastically deformable members 45 are no longer held in tension, and so the tendency of the elastically deformable members 45 to maintain the equal pitch is no longer effective, the cylinders 59 will prevent the pitch reducing below a minimum value by adjacent cylinders 59 sliding along the wires/lines 43 until they abut (as shown in FIGS. 10A and 10B), whereafter no further reduction in pitch in the region of the cylinders 59 is possible.

Figure 8:
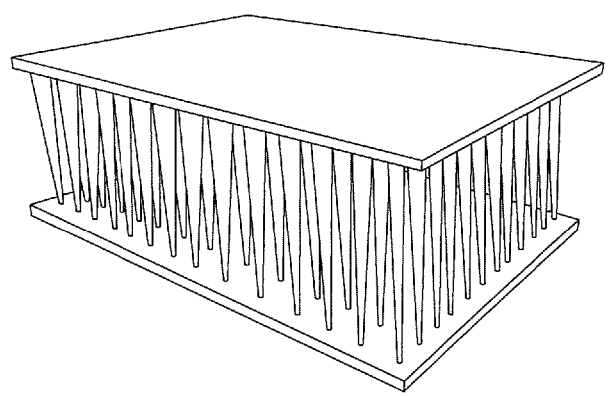
FIG. 8 shows a perspective view of a drop thread material.

The cylinders 59 may be inflatable. They may each be a unitary inflatable structure, or may comprise a series of connected inflatable linear tubes or tubular rings which may allow for easier integration with other parts of the slide. The cylinders 59 may be formed of drop stitch (or drop thread) material, having a form as shown in FIG. 8. In such drop stitch a material, thousands of (e.g. nylon) threads connect the opposite faces to keep the panels in the desired shape when inflated and to provide rigidity. By having the cylinders 59 inflatable, this allows for the slide to be stored in a compact deflated state. The cylinders 59 when deflated do not prevent the pitch reducing below the minimum value mentioned above—thereby facilitating compact storage.

Figure 11:
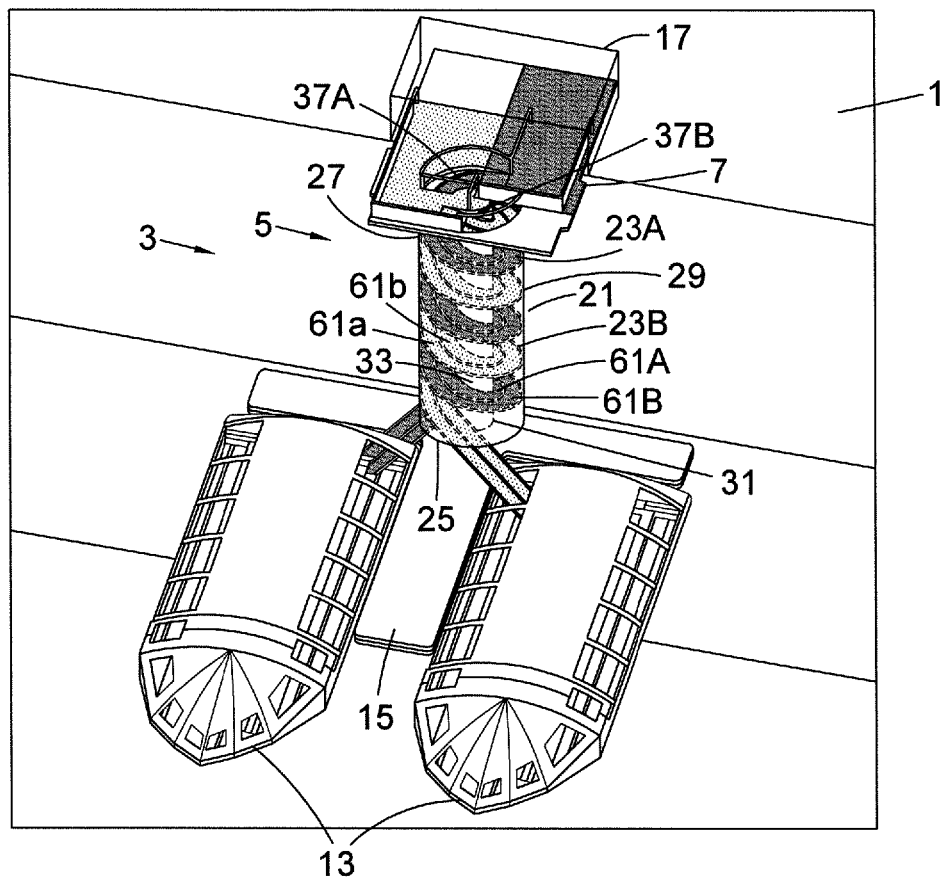
FIG. 11 shows a close up perspective view of a slide having one slide assembly providing helical escape paths for passengers having twin tracks for passengers.

FIG. 11 shows an alternative arrangement of slide 5 to that of FIG. 2, in which a single slide assembly 21 is provided.

The slide assembly 21 provides two helical paths 23*a* and 23*b*, each having a plurality of helix turns 24.

The slide assembly 21 is of generally cylindrical form, and has an exit end 25 attached to the sea platform 15 and an entry end 27 attached to the entry platform 7. The slide assembly 21 includes a substantially cylindrical outer wall 29 and substantially cylindrical inner wall 31. The outer wall 29 and inner wall 31 are formed from elastically deformable sheet material. The inner wall 31 defines a central substantially cylindrical space 33 along which the central axes of the helical paths 23*a* and 23*b* extend.

Between the outer wall 29 and the inner wall 31 an annular space is defined that accommodates the helical paths 23*a* and 23*b*. The helical paths 23*a* and 23*b* are preferably fixed to the outer wall 29 and inner wall 31. The helical paths 23*a* and 23*b* may have a double helix configuration. The helical paths 23*a* and 23*b* are interlaced. Each of the helical paths 23*a* and 23*b* turn in the same sense about the cylindrical space 33.

In contrast to FIG. 2, where each helical path 23*a* and 23*b* provides a single track along which an evacuating passenger can slide, the FIG. 11 arrangement provides each of the helical paths 23*a* and 23*b* with twin tracks 61*a* and 61*b* arranged side by side. A dividing wall may be provided between the tracks 61*a* and 61*b*. The dividing wall may be formed of drop stitch material of the type shown in FIG. 8.

At each entrance 37*a* and 37*b* the two tracks 61*a* and 61*b* are available, so two passengers can enter each of the helical paths 23*a* and 23*b* simultaneously. The entrance 37*a* to the helical path 23*a* is spaced on the entry platform 7 from the entrance 37*b* to the helical path 23*b*, thereby allowing passengers to enter each of the helical paths 23*a* and 23*b* (each having two tracks) simultaneously.

The helical path 23*a* has an exit 39*a* directly into a first of the life rafts 13, and the other helical path 23*b* has an exit 39*b* directly into a second of the life rafts 13.

Although each of the helical paths 23*a* and 23*b* is described with twin tracks 61*a* and 61*b* arranged side by side, it should be understood that tree or more tracks (arranged side by side, or otherwise) may be provided.

Although two helical paths 23a and 23b are described, it should be understood that one, three or more helical paths (each with one, two, three or more tracks) may be provided.

According to the FIG. 11 embodiment, although only a single slide assembly 21 is provided, the evacuation rate is generally the same as the slide of FIG. 2 due to the twin tracks 61a and 61b.

Figure 12:
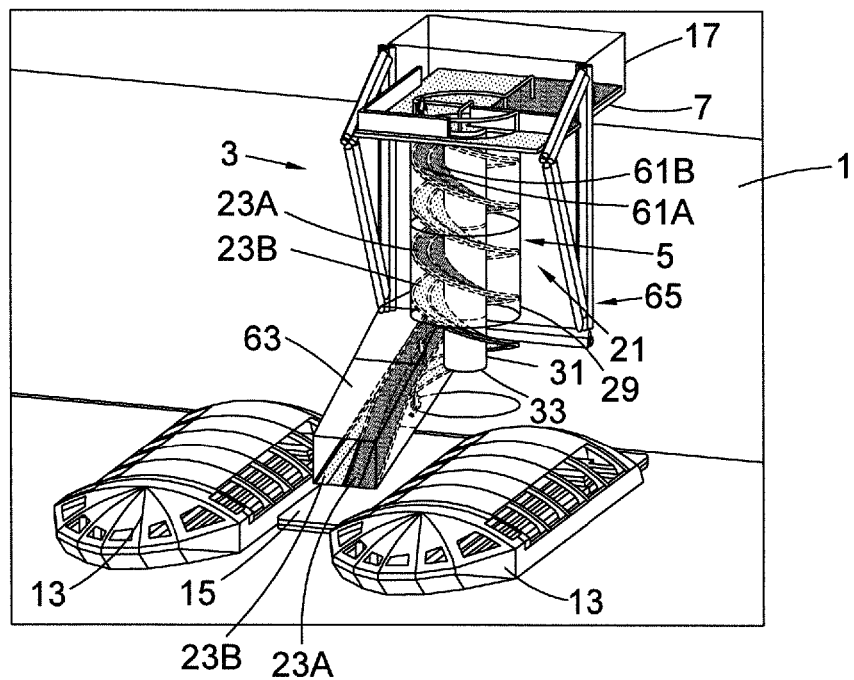
FIG. 12 shows a close up perspective view of a slide having one slide assembly providing helical escape paths for passengers but ending in an inclined linear slide section.

FIG. 12 shows a further arrangement of the slide 5, which includes a slide assembly 21 of the same general configuration as in FIG. 11, having two helical paths 23a and 23b, each with twin tracks 61a and 61b. The helical paths extend from the entry platform 7 but not all the way to the sea platform 15. Instead, a liner (non-helical) slide assembly (linear path portion) 63 extends from the lowermost helix turn of each other helical paths 23a and 23b to the upper surface of the sea platform 15. In this embodiment the slide assembly 21 having the helical paths 23a and 23b may have a fixed vertical length (rather than concertinaing in the manner of the previously described embodiments). Variations in distance between the entry platform 7 and the surface of the sea are accommodated by variations in the angle of inclination of the linear slide assembly 63 to the upper surface of the sea platform 15. The slide assembly (linear path portion) 63 extends obliquely to a central axis of the helical paths 23a and 23b.

In any of the embodiments it is advantageous for the slide 5 to be attached to the ship 1, not only where it connects to the entry platform 7, but also at one or more positions closer to the surface of the sea.

Figure 13:
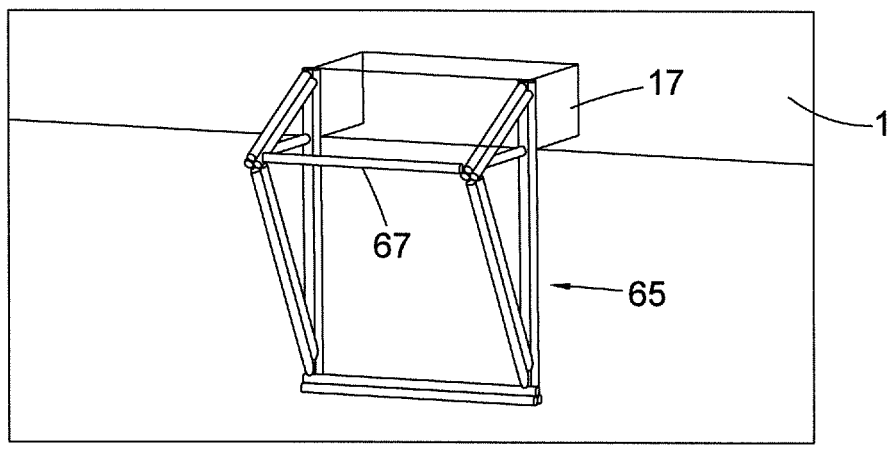
FIG. 13 shows a close up perspective view of a bowsing line fixture point.

A bowsing arrangement includes a plurality of retractable or removable bowsing attachment parts, such as retractable or removable bowsing line fixture points 65. FIG. 12 shows one example of a bowsing line fixture point 65 that is fixed to the hull of the ship 1 and to which the slide 5 is attached by a bowsing line (not shown). The bowsing line fixture point 65 in shown more clearly on FIG. 13, and comprises a plurality of reinforced high pressure inflatable tubes or portions 67. The tubes 67 may be mounted to the hull of the ship 1 by the storage unit 17 or entry platform 7. The tubes 67 may provide a bowsing line fixing location close to the waterline that the storage unit 17 or entry platform 7—e.g. 10 meters closer to the waterline that the storage unit 17 or entry platform 7. Advantageously, the inflatable tubes 67 may be deflated when not in use. The tubes may be formed of drop stitch material of the type shown in FIG. 8.

A plurality of retractable or removable bowsing line fixture points 65 may be mounted spaced apart to the vessel 1 and for attachment to corresponding attachment parts spaced along the slide 5 between an entrance 11 to the slide at the vessel 1 and the water.

The bowsing line fixture points 65 may be configured to be magnetically coupled to the structure.

The bowsing line fixture points 65 may comprise a plurality of sections moveable between a deployed configuration and a retracted configuration. The bowsing line attachment part sections may be configured foldable or mounted for telescopic relative movement.

The bowsing line fixture points 65 may be configured to be coupled to the vessel 1 by suction.

One or more bowsing line fixture points 65 may be used with any embodiment of the invention, including those shown in FIGS. 2 to 7 and 9 to 11.

FIGS. 14A to 14D show an example of a suitable arrangement of bowsing lines 71 for bowsing the sea platform 15 to the ship 1.

A first pair 71a of bowsing lines extend from the entry platform 7 to opposite ends of the top bar 100 of the T-shaped sea platform 15. These lines 71a may pass through channels in the sea platform 15 to a first pair of submerged weights 75a.

A second pair 71b of bowsing lines extend from mounting points 73 on the hull of the ship, spaced along the hull from the entry platform 7, to the opposite ends of the top bar of the T-shaped platform 15. These lines 71b may pass through the channels in the sea platform 15 to the first pair of submerged weights 75a.

A third pair 71c of bowsing lines extend from the mounting points 73 on the hull of the ship 1 to the distal end of a central bar 101 of the T-shaped sea platform 15. As best shown in FIG. 146, these lines 71c may pass through a channel in the sea platform 15 to the first pair of submerged weights 75a.

Figure 14A:
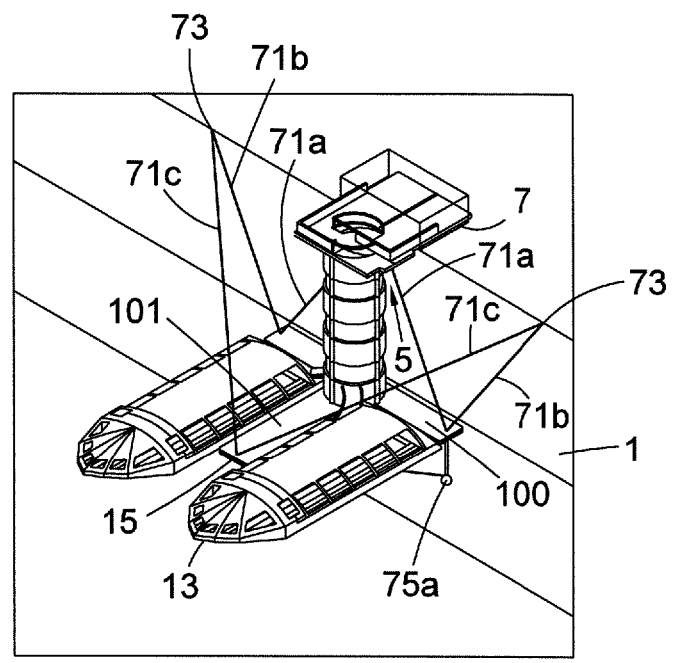
FIG. 14A shows a perspective view of a bowsing arrangement for a platform for use with the slide and crafts.
Figure 14B:
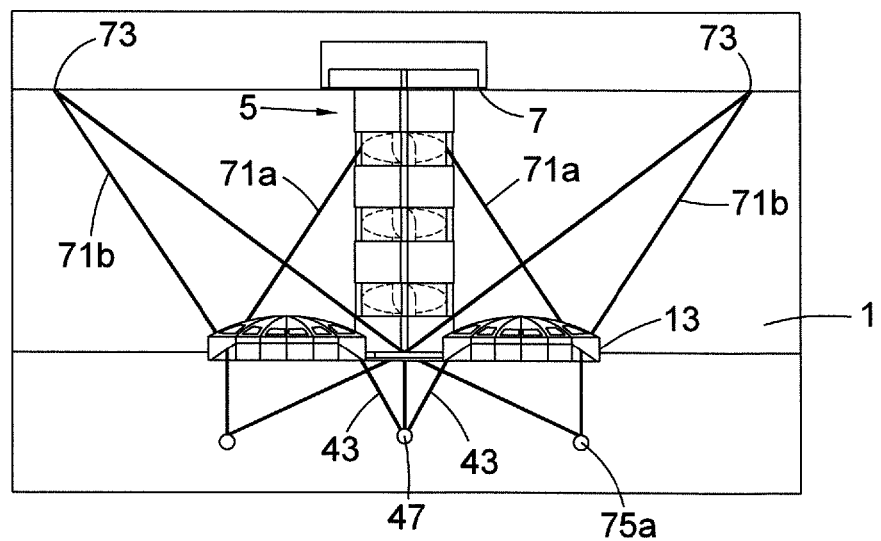
FIG. 14B shows a side elevational view of the bowsing arrangement of FIG. 14A.
Figure 14C:
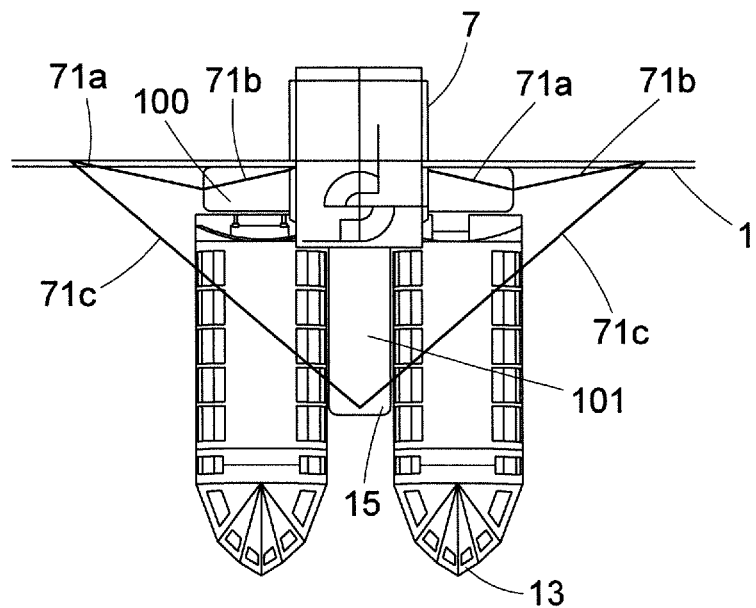
FIG. 14C shows an overhead plan view of the bowsing arrangement of FIG. 14A.
Figure 14D:
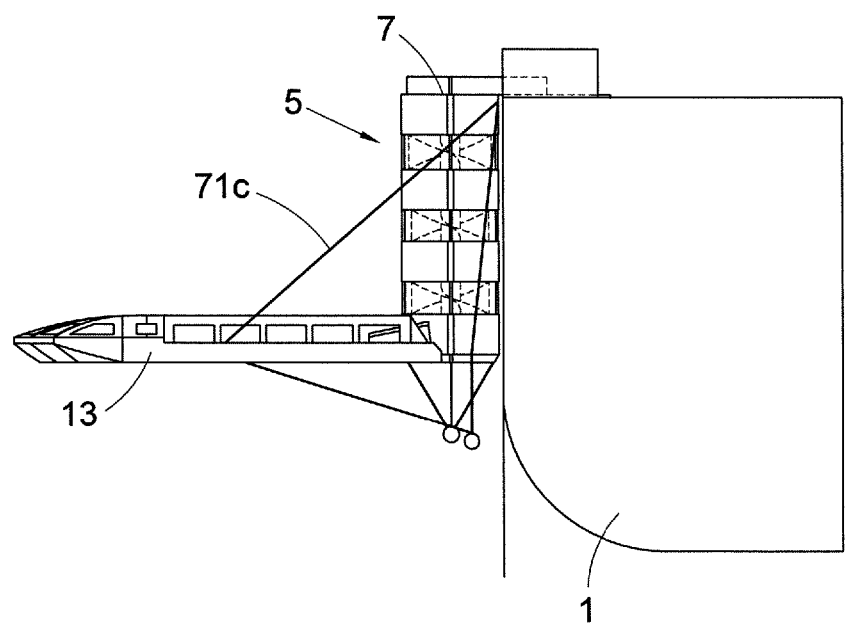
FIG. 14D shows a front elevational view of the bowsing arrangement of FIG. 14A.

As best shown in FIG. 14b, the wires/lines 43 described above extend through channels in the sea platform to the submerged weight 47.

Figure 7:
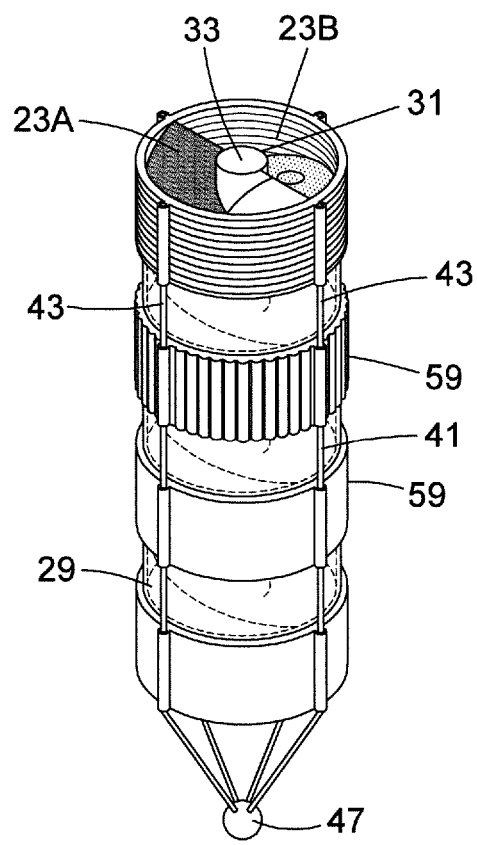
FIG. 7 shows a perspective view of a fifth spacing arrangement for the helix turns of a slide assembly.

In FIGS. 14A to 14D the slide 5 is of the form shown in the FIG. 7 embodiment, although the bowsing arrangement is applicable to other forms of slide described above.

Figure 15A:
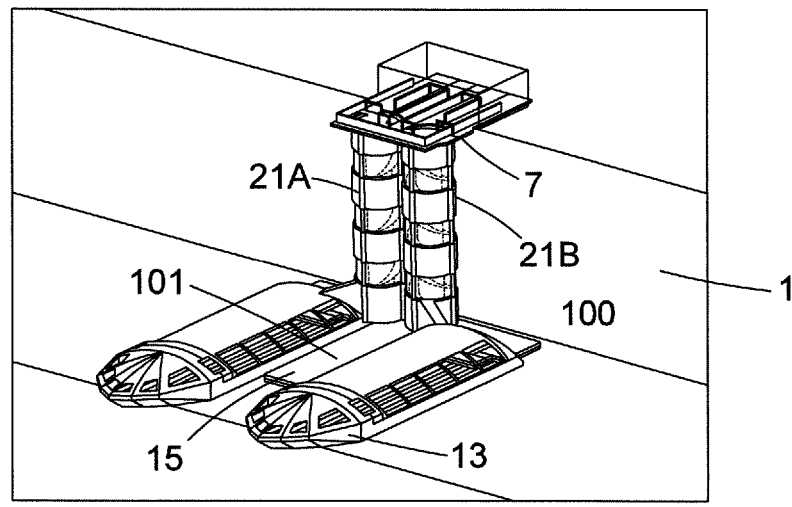
FIG. 15A shows a perspective view of an example arrangement having two side-by-side slide assemblies.
Figure 15B:
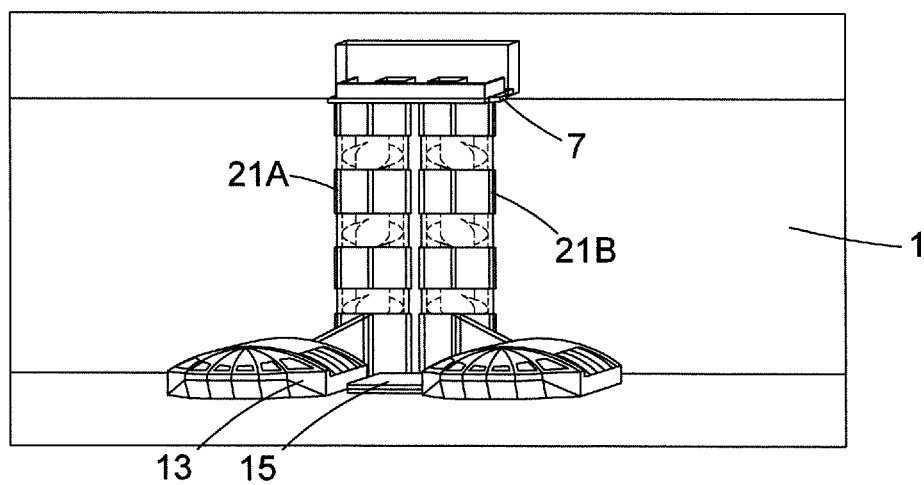
FIG. 15B shows a side elevational view of an example arrangement having two side-by-side slide assemblies of FIG. 15A.

FIGS. 15A and 15B show a slide 5 of the type of the FIG. 7 embodiment, where two side-by-side parallel slide assemblies 21A and 21B are provided and extend between the entry platform 7 and the sea platform 15.

In any of the embodiments the helical paths 23A and 23B may each be formed of a continuous helical member (as shown in FIGS. 2 to 7 and 8 to 15) that extends from the entry platform 7 to the sea platform 15. The continuous members may be inflatable. The continuous members may be formed of drop stitch material of the type shown in FIG. 8.

As an alternative to continuous members, the helical paths 23a and 23b may be formed of a series of discrete parts.

Figures 16A, 16B:
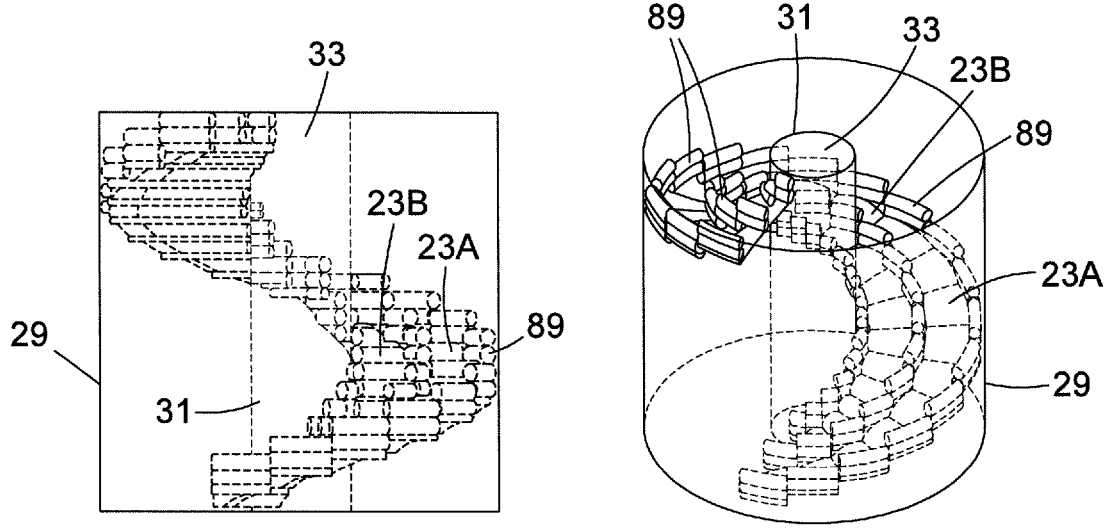
FIG. 16A shows a partial side elevational view of an alternative helical path arrangement.
FIG. 16B shows a partial perspective view of the alternative helical path arrangement of FIG. 16A.
Figure 16C:
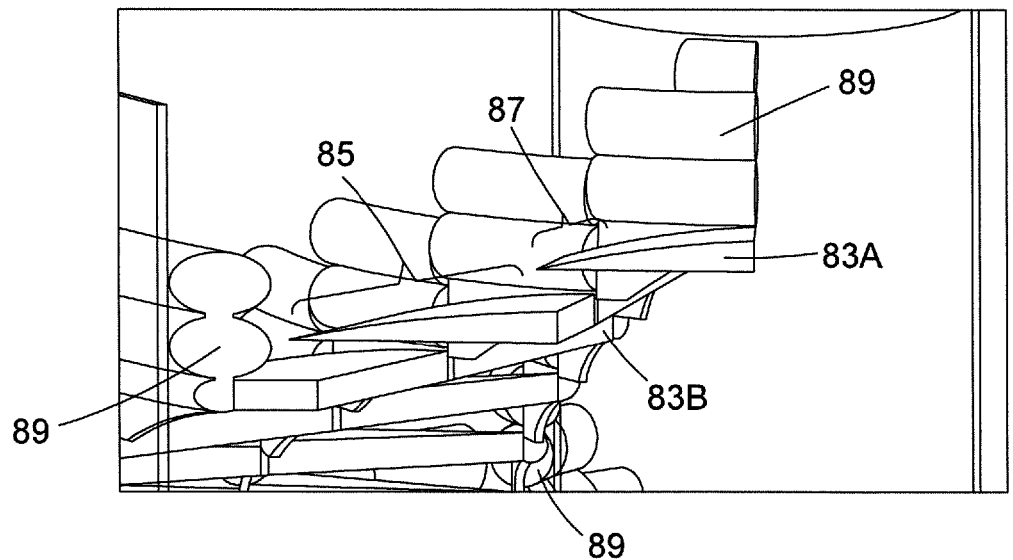
FIG. 16C shows a partial enlarged perspective view of the alternative helical path arrangement of FIG. 16A.

FIGS. 16A, B and C show an arrangement of the helical paths 23A and 23B, where the paths are formed by a plurality of partially overlapping sections 83A and 83B. Each section 83A and 83B has an upper surface having an exposed portion 85 and overlapped portion 87 that is overlapped by the section immediately above. The exposed portion 85 are arranged to define a helical path and are the surfaces along which evacuating passengers slide. The sections 83A and 83B may be tapered from the overlapped portion 87 to the distal end of the exposed portion 85 to provide an inclined surface along which the evacuating passengers slide. The gap between the sections 83A and 83B may vary in some embodiments as the distance between the entry platform 7 and the surface of the sea varies.

The sections 83A and 83B may be inflatable, and may be formed of drop stitch material of the type shown in FIG. 8. However, it should be understood that the sections 83A and 83B (and any other parts shown in FIGS. 16A, B and C) may be non-inflatable—e.g. they may be solid or hollow and rigid or flexible.

In any of the embodiments dividing walls 89 may be provided between the helical paths 23A and 23B, between the helical path 23A and the outer wall 29, and between the helical path 23B and the inner wall 31. The dividing walls 89 may be formed of a series of cylindrical sections. The sections may be inflatable, and may be formed of drop stitch material of the type shown in FIG. 8.

Figures 17A, 17B:
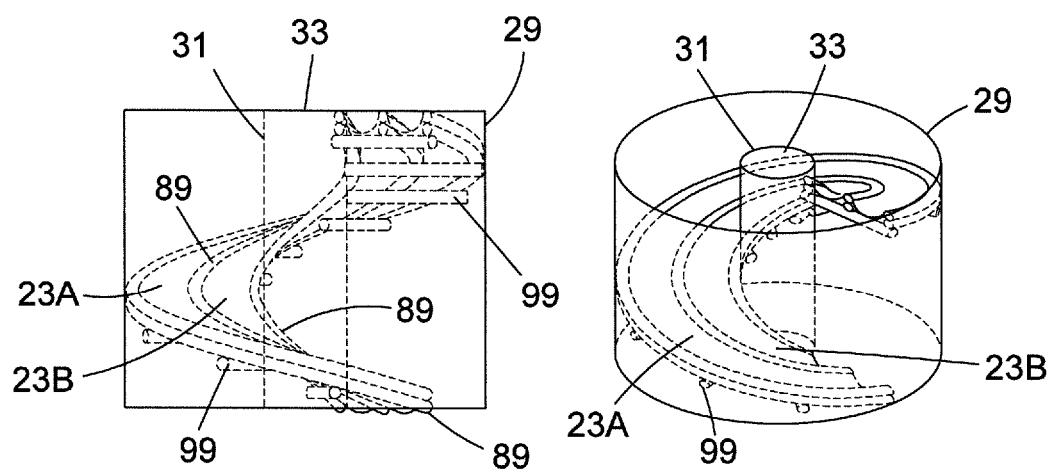
FIG. 17A shows a partial side elevational view of another alternative helical path arrangement.
FIG. 17B shows a partial perspective view of the alternative helical path arrangement of FIG. 17A.

In any of the embodiments, as shown in FIGS. 17A and 17B, a plurality of transverse horizontal supports 99 may be provided underneath the helical paths 23A and 23B, and which are attached at opposite ends to the outer wall 29 and the inner wall 31, respectively. The supports 99 may be inflatable. The supports may be formed of drop stitch material of the type shown in FIG. 8.

Figures 18A, 18B:
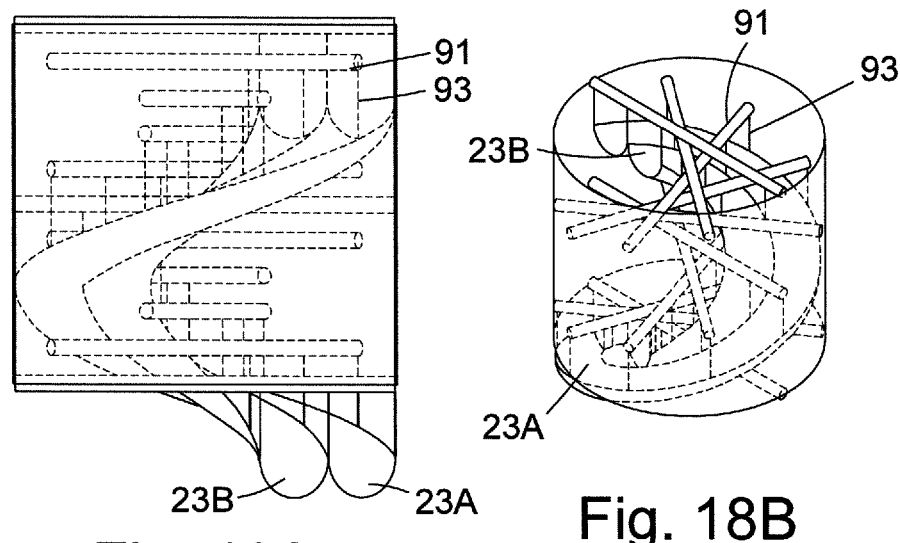
FIG. 18A shows a partial side elevational view of yet another alternative helical path arrangement.
FIG. 18B shows a partial perspective view of the alternative helical path arrangement of FIG. 18A.

The helical paths 23A and 23B may alternatively, or additionally, be suspended by supports 91 from above, as shown in FIGS. 18a and 18b. The supports 91 are attached at opposite ends to the outer wall 29 and the inner wall 31. The supports 91 are attached to the helical paths 23a and 23b by cables 93.

FIG. 19 shows in detail an example configuration of the sea platform 15. The sea platform 15 may be inflatable. The sea platform 15 may be formed from drop stitch material of the type shown in FIG. 8.

The edges of the central bar 100 of the sea platform 15 (that extends from the top bar 101 of the sea platform 15) include vertical walls 102 that extend above the flat upper surface of the platform 15 along all or part of the central bar 100.

Additionally, or alternatively, longitudinal stiffening beams 104 may be provided along the central bar 100.

Embodiments have been described with one slide assembly, with two slide assemblies, and with one or two tracks for each helical slide. It should be understood that more than two slide assemblies and/or more than two tracks may be provided. Aspects of the different embodiments may be mixed with one another—e.g. so that a single slide assembly is provided with a single helical path having one or two tracks.

The invention claimed is:

1. An escape system comprising a slide for facilitating evacuation from a structure to water, wherein the slide comprises at least one helical inflatable path and a plurality of inflatable tubular parts formed of drop stitch material for controlling a pitch between helix turns of the at least one helical inflatable path, wherein the plurality of inflatable tubular parts is operable to set a minimum distance between two adjacent helix turns of the at least one helical inflatable path, and wherein the plurality of inflatable tubular parts is attached to the slide, a gap between adjacent ones of the plurality of inflatable tubular parts varying with the pitch between the two adjacent helix turns, and abutment of adjacent tubular parts preventing a distance between the two adjacent helix turns falling below said minimum distance.

2. The escape system of claim 1, wherein the at least one helical inflatable path is configured to extend generally vertically between the structure and the water.

3. The escape system of claim 2, wherein two of said helical inflatable paths are arranged side by side with spaced apart and substantially parallel central axes.

4. The escape system of claim 1, wherein the slide comprises a plurality of helical inflatable paths.

5. The escape system of claim 4, wherein a first of said helical inflatable paths and a second of said helical inflatable paths have a common central axis.

6. The escape system of claim 4, wherein a first of said helical inflatable paths and a second of said helical inflatable paths have a double helix configuration.

7. The escape system of claim 4, wherein a first of said helical inflatable paths and the second of said helical inflatable paths are interlaced.

8. The escape system of claim 1, wherein the plurality of inflatable tubular parts are operable to maintain a substantially equal distance between adjacent helix turns of the at least one helical inflatable paths.

9. The escape system of claim 1, including a plurality of elastically deformable members extending along the slide, the elastic deformable members being attached to the slide at spaced apart locations along a length of the slide and being held in tension.

10. The escape system of claim 1, including a winch or pulley system.

11. The escape system of claim 1, wherein the slide includes a plurality of bowsing attachment parts spaced apart along the slide between an entrance to the slide at the structure and the water.

12. The escape system of claim 1, wherein the slide includes at least one exit configured to allow evacuees from the structure to transfer from the slide to at least one craft.

13. The escape system of claim 1, including a platform for floating on the water, the platform being attached to the slide.

14. The escape system of claim 13, wherein the platform is configured to secure thereto at least one craft during boarding of evacuees.

15. The escape system of claim 1, wherein the at least one helical inflatable path is formed by a plurality of partially overlapping sections.

16. The escape system of claim 15, wherein a first one of said plurality of partially overlapping sections has an upper surface having an exposed portion and an overlapped portion that is overlapped by a second one of the plurality of partially overlapping sections above, the exposed portion of the upper surfaces of the first one of said plurality of partially overlapping sections being arranged to define the at least one helical inflatable path.

17. The escape system of claim 1, wherein the slide includes a linear path portion that extends from the at least one helical inflatable path.

18. The escape system of claim 17, wherein the linear path portion extends obliquely to a central axis of the at least one helical inflatable path.

19. The escape system of claim 18, wherein an exit of the slide is formed at an end of a linear portion.

20. The escape system of claim 1, wherein a plurality of dimensions of the slide are so chosen that evacuees from the structure travel along the at least one helical inflatable path at a speed of between 1 and 10 kph.

21. The escape system of claim 20, wherein one of the plurality of dimensions is a diameter of a substantially cylindrical space around which the at least one helical inflatable path extends.

22. The escape system of claim 20, wherein one of the plurality of dimensions is a pitch of the at least one helical inflatable path.

23. The escape system of claim 20, wherein one of the plurality of dimensions is a length of the slide.

24. The escape system of claim 1, wherein the slide includes a substantially cylindrical outer wall extending around an outer periphery of the at least one of the helical inflatable path, the substantially cylindrical outer wall being longitudinally elastically deformable to accommodate changes in distance between an entrance to the slide at the structure and the water.

25. The escape system of claim 1, wherein the slide includes a substantially cylindrical inner wall extending around an inner periphery of the at least one of the helical inflatable path, the substantially cylindrical inner wall being longitudinally elastically deformable to accommodate changes in distance between an entrance to the slide at the structure and the water.

26. A bowsing arrangement for an escape system that has a slide for facilitating evacuation from a structure to water, the bowsing arrangement including a plurality of retractable or removable bowsing attachment parts for being mounted spaced apart to the structure and for attachment to corresponding attachment parts spaced along the slide between an entrance to the slide at the structure and the water, wherein the plurality of retractable or removable bowsing attachment parts include an inflatable portion.

27. The bowsing arrangement of claim 26, wherein the plurality of retractable or removable bowsing attachment parts are configured to be magnetically coupled to the structure.

28. The bowsing arrangement of claim 26, wherein the plurality of retractable or removable bowsing attachment parts comprise a plurality of sections moveable between a deployed configuration and a retracted configuration.

29. The bowsing arrangement of claim 28, wherein the plurality of sections are configured foldable or mounted for telescopic relative movement.

30. The bowsing arrangement of claim 26, wherein the plurality of retractable or removable bowsing attachment parts are configured to be coupled to the structure by suction.

* * * * *